(12) United States Patent
Li et al.

(10) Patent No.: US 8,082,132 B2
(45) Date of Patent: Dec. 20, 2011

(54) METHOD FOR MODELING SMOKE PROPAGATION

(75) Inventors: Qing Li, Shnaghai (CN); Thomas A. Plocher, Hugo, MN (US)

(73) Assignee: Honeywell International Inc., Morristown, NJ (US)

( * ) Notice: Subject to any disclaimer, the term of this patent is extended or adjusted under 35 U.S.C. 154(b) by 757 days.

(21) Appl. No.: 11/784,697

(22) Filed: Apr. 9, 2007

(65) Prior Publication Data
US 2008/0248450 A1 Oct. 9, 2008

(51) Int. Cl.
G06G 7/48 (2006.01)
(52) U.S. Cl. ................................. 703/6; 703/9
(58) Field of Classification Search .................. 703/2, 5, 703/6, 9; 434/226; 340/691.1
See application file for complete search history.

(56) References Cited

U.S. PATENT DOCUMENTS

| | | | |
|---|---|---|---|
| 6,496,110 B2* | 12/2002 | Peterson et al. | 340/522 |
| 6,778,071 B2* | 8/2004 | Megerle | 340/332 |
| 7,026,947 B2* | 4/2006 | Faltesek et al. | 340/691.1 |
| 7,154,379 B2* | 12/2006 | Reed | 340/286.05 |
| 7,629,894 B2* | 12/2009 | Plocher et al. | 340/692 |
| 7,683,793 B2* | 3/2010 | Li et al. | 340/628 |
| 2008/0157984 A1* | 7/2008 | Li et al. | 340/584 |

FOREIGN PATENT DOCUMENTS
AU 734 148 B2 6/2001

OTHER PUBLICATIONS

He et al., "Smoke Spread Experiment in a Multi-storey Building and Computer Modelling", Fire Safety Journal, vol. 28, Issue 2, Mar. 1997, pp. 139-164.*
Fu et al., "A Two-Zone Fire Growth and Smoke Movement Model for Multi-Compartment Building", Fire Safety Journal, vol. 34, Issue 3, Apr. 2000, pp. 257-285.*
Jones et al., "CFAST—Consolidated Model of Fire Growth and Smoke Transport (Version 6) Technical Reference Guide", NIST Special Publication 1026, National Institute of Standards and Technology, Dec. 2005.*

(Continued)

*Primary Examiner* — Kamini S Shah
*Assistant Examiner* — Herng-Der Day
(74) *Attorney, Agent, or Firm* — Schwegman, Lundberg & Woessner, P.A.

(57) ABSTRACT

A method and computer-readable medium for modeling smoke propagation in a structure are presented, along with applications of the method. A model is provided of a multiplicity of compartments within the structure, and the presence of a fire within a compartment is determined. The energy and smoke released by the fire is estimated, and smoke flows out of the compartment are determined. Each compartment having a smoke source is analyzed, individually, for the propagation of smoke. Each compartment is assumed to have a homogenous upper smoke layer and a lower cool air layer. The analysis includes a mass and energy balance to determine the change in characteristics of the upper smoke layer, where a known pressure for the lower cool air layer is used for the balance. For multiple smoke sources into a compartment, the contributions to the mass and energy balance of each smoke source are considered additive.

29 Claims, 6 Drawing Sheets

OTHER PUBLICATIONS

Peacock et al., "CFAST—Consolidated Model of Fire Growth and Smoke Transport (Version 6) User's Guide", NIST Special Publication 1041, National Institute of Standards and Technology, Dec. 2005.*

International Search Report for PCT/US2008/059527 dated Aug. 11, 2008.

Hua J., et al. "Development of a Hybrid Field and Zone Model for Fire Smoke Propagation Simulation in Buildings" Fire Safety Journal, Elsevier, vol. 40, No. 2, Mar. 1, 2005, pp. 99-119, XP004732111, ISSN: 0379-7112.

Raymond Friedman "An International Survey of Computer Models for Fire and Smoke" Journal of Fire Protection Engineering, vol. 4, No. 3, Dec. 31, 1992, pp. 81-92, XP002490268.

Forney G P et al., "Understanding Fire and Smoke Flow Through Modeling and Visualization" IEEE Computer Graphics and Applications, IEEE Service Center, New York, NY, US, vol. 23, No. 4, Jul. 1, 2003, pp. 6-3, XP011097695, ISSN: 0272-1716.

* cited by examiner

METHOD FOR MODELING SMOKE PROPAGATION

FIELD OF THE INVENTION

The invention relates to a method for modeling smoke propagation, and more particularly to a method for rapidly modeling smoke propagation on a building-wide scale.

BACKGROUND

The ability to model smoke and fire propagation in a structure permits users to model the likely paths that smoke and fire might take. This ability generally provides the greatest benefits for the development of emergency procedures in advance of emergency situations. The modeling of smoke and fire propagation permits emergency planners to determine portions of structures that are generally more susceptible to fire and smoke damage, and to better develop evacuation routes that may be used in a later emergency situation. In addition, the ability to model smoke and fire propagation may permit building managers to make informed decisions regarding the placement of certain infrastructure. As a result, building managers may act so as to place critical or more valuable equipment in locations that are determined to be less-susceptible to smoke and fire damage.

Currently, there exists several smoke propagation modeling methods. However, these existing methods are usually not suitable for real-time applications. Existing methods are generally offline simulators that, while capable of modeling the spread of smoke for smaller fires, still require minutes or even hours to produce results. Although these methods may be capable of producing very accurate models of smoke and fire propagation, they cannot produce results in a matter of seconds and are therefore not conducive to real-time applications. Thus, emergency planners can only utilize the information provided by these models to develop pre-determined evacuation routes, and cannot provide adaptive evacuation routes based upon a current fire or smoke emergency. Similarly, building managers are limited to in-advance planning of infrastructure distribution, and cannot use current smoke propagation models to either control building resources or consult with emergency personnel so as to direct the spread of smoke or fire away from critical resources.

In addition, most existing methods are not applicable to large structures having a large number of compartments. For example, Consolidated Model of Fire and Smoke Transport (CFAST) software, developed by the National Institute of Standards and Technology (NIST), has a processing limit of 30 compartments, while an ordinary building may have more than 1,000 compartments. As a result, the results provided by current modeling methods may not be suitable for determining emergency procedures on a building-wide scale. Similarly, the current methods may not provide building managers and emergency personnel with sufficient information to properly allocate resources in an emergency.

Finally, the modeling of fire and smoke propagation in advance of an event for emergency and building planning provides insufficient information to deal with the variability of actual emergency situations. For example, in a fire within an enclosed structure, movement around the structure along pre-determined evacuation paths can be inhibited by both the fire and the smoke generated by the fire. The propagation of smoke within the structure can cause entrances and exits to become unusable, thereby frustrating actions on behalf of emergency personnel to reliably enter and evacuate persons located in the structure. Having a method to predict smoke propagation in a structure in real-time would enable the use of adaptive evacuation and entry planning by emergency personnel, such as fire fighters or fire incident commanders. These emergency personnel could utilize adaptive planning to identify and exclude unsafe routes based on smoke propagation, and to select safer routes for movement within the structure.

In addition, real-time smoke propagation modeling methods can be used to aid emergency personnel and building managers in controlling the spread of fire and smoke. By being able to quickly predict the future spread of smoke and fire, emergency personnel or building managers may be able to restrict the spread of smoke and fire damage to affected areas, or possibly direct the damage away from critical components. Thus, the need exists for real-time smoke and fire propagation modeling in order to aid emergency personnel and building managers in making informed decisions during emergency situations.

SUMMARY

A method and computer-readable medium for modeling smoke propagation in a structure are presented, along with applications of the method. The method for modeling smoke propagation has reduced complexity and computational intensity as compared to previously existing methods, allowing for real-time modeling of smoke conditions in the structure. The reduced complexity arises out of several assumptions and simplifications regarding the behavior of smoke levels and the variability of pressures within structure compartments. In addition, according to the modeling method, each compartment in the structure may be analyzed individually, and without requiring that boundary conditions between all compartments be satisfied. In one application, the rapid modeling capabilities of the method provide for the ability to predict safe routes for ingress into and egress out of the structure. In another application, the rapid modeling capabilities of the method provide for the ability to adjust structure mechanisms so as to control the propagation of smoke through the structure.

In one example, a method for modeling smoke propagation includes providing a model of the structure, wherein the model comprises a multiplicity of compartments, each compartment comprising (i) an upper smoke layer having an associated temperature and concentration, and (ii) a lower cool air layer having an associated pressure. The model may also include a multiplicity of connections between one or more of the compartments, each connection describing air flow from an upstream compartment to one or more downstream compartments. The method may also include receiving sensor data indicating one or more compartments as having a fire therein, and then analyzing the smoke propagation in each compartment that has a smoke source in it, where the smoke source is one of either a fire or a smoke flow. The step of analyzing the smoke propagation in a compartment may comprise evaluating a plume flow of the smoke source in the compartment, performing a mass and energy balance based on the plume flow to provide estimated characteristics, such as the temperature and concentration of the upper smoke layer of the compartment, and determining from the mass and energy balance the presence of any smoke flows into downstream compartments. The mass and energy balance may take as it inputs the characteristics of any smoke plumes within the compartment or any smoke flows entering the compartment, along with various characteristics of the compartment itself (such as the dimension of the compartment) and any connections in the compartment. With the above inputs, each compartment can be analyzed individually for any smoke propagation therein. For the purposes of the mass and energy balance, the pressure of the lower cool air layer may be known for the modeled propagation period, and may be held constant, or may vary according to a known time-dependent relationship. The modeling method may also include storing the characteristics of the upper smoke layer of each compartment having a smoke source therein. Once stored, these characteristics may also be displayed to a user.

in an alternative example, the above method for modeling smoke propagation may be embodied in a computer-readable medium, where the computer-readable medium contains instructions that are readable by a computer, such that when the computer executes the instructions it performs the following steps: providing a model of the structure, wherein the model comprises a multiplicity of compartments, each compartment comprising (i) an upper smoke layer having an associated temperature and concentration, and (ii) a lower cool air layer having an associated pressure, and wherein the model further comprises a multiplicity of connections between one or more of the compartments, each connection describing air flow from an upstream compartment to one or more downstream compartments; receiving sensor data indicating one or more compartments as having a fire therein, and then analyzing the smoke propagation in each compartment that has a smoke source in it, where the smoke source is one of either a fire or a smoke flow, wherein the step of analyzing the smoke propagation in a compartment may comprise evaluating a plume flow of the smoke source in the compartment, performing a mass and energy balance based on the plume flow to provide estimated characteristics (such as the temperature and concentration of the upper smoke layer of the compartment), wherein for the purposes of the mass and energy balance the pressure of the lower cool air layer is known; determining from the mass and energy balance the presence of any smoke flows into downstream compartments; and storing the characteristics of the upper smoke layer of each compartment having a smoke source therein.

In yet another alternative example, a system for modeling the propagation of smoke in a structure may comprise a processor, a processor-readable medium, and a display. The processor-readable medium in the system may contain instructions that are readable by a processor, such that when the processor executes the instructions, the following steps for carrying out the modeling of smoke propagation in a structure are carried out: providing a model of the structure, wherein the model comprises a multiplicity of compartments, each compartment comprising (i) an upper smoke layer having an associated temperature and concentration, and (ii) a lower cool air layer having an associated pressure, and wherein the model further comprises a multiplicity of connections between one or more of the compartments, each connection describing air flow from an upstream compartment to one or more downstream compartments; receiving sensor data indicating one or more compartments as having a fire therein, and then analyzing the smoke propagation in each compartment that has a smoke source in it, where the smoke source is one of either a fire or a smoke flow, wherein the step of analyzing the smoke propagation in a compartment may comprise evaluating a plume flow of the smoke source in the compartment, performing a mass and energy balance based on the plume flow to provide estimated characteristics (such as the temperature and concentration of the upper smoke layer of the compartment), wherein for the purposes of the mass and energy balance the pressure of the lower cool air layer is known; determining from the mass and energy balance the presence of any smoke flows into downstream compartments; and storing the characteristics of the upper smoke layer of each compartment having a smoke source therein. The characteristics of the upper smoke layer may then be displayed to a user on the display.

In yet another alternative example, a method of adaptively planning safe routes in a structure comprises detecting the presence of a fire in the structure, and modeling the propagation of smoke in the structure, wherein modeling the propagation of smoke comprises the steps of: providing a model of the structure, wherein the model comprises a multiplicity of compartments, each compartment comprising (i) an upper smoke layer having an associated temperature and concentration, and (ii) a lower cool air layer having an associated pressure; and a multiplicity of connections between one or more of said compartments, each connection describing air flow from an upstream compartment to one or more downstream compartments; receiving sensor data indicating one or more compartments as having a fire therein; analyzing the smoke propagation in each compartment having a smoke source therein, wherein the smoke source is one of either a fire or a smoke flow, and wherein analyzing the smoke propagation comprises evaluating a plume flow of the smoke source therein; performing a mass and energy balance based on the plume flow to provide an estimated temperature and concentration of the upper smoke layer of the compartment, wherein the pressure of the lower cool air zone of the compartment is known; and determining from the mass and energy balance the presence of any smoke flows into downstream compartments; and storing the estimated temperature and concentration of the upper smoke layer of each compartment having a smoke source therein. The method of adaptively planning safe routes in the structure may further comprise identifying one or more safe routes within the structure based on known route criteria, and also communicating to a user the one or more safe routes.

In yet another alternative example, a method of controlling the propagation of smoke in a structure may comprise detecting the presence of a fire in the structure, and modeling the propagation of smoke in the structure to create a predicted smoke propagation path, wherein modeling the propagation of smoke comprises the steps of: providing a model of the structure, wherein the model comprises a multiplicity of compartments, each compartment comprising (i) an upper smoke layer having an associated temperature and concentration, and (ii) a lower cool air layer having an associated pressure; and a multiplicity of connections between one or more of said compartments, each connection describing air flow from an upstream compartment to one or more downstream compartments; receiving sensor data indicating one or more compartments as having a fire therein; analyzing the smoke propagation in each compartment having a smoke source therein, wherein the smoke source is one of either a fire or a smoke flow, and wherein analyzing the smoke propagation comprises evaluating a plume flow of the smoke source therein; performing a mass and energy balance based on the plume flow to provide an estimated temperature and concentration of the upper smoke layer of the compartment, wherein the pressure of the lower cool air zone of the compartment is known; and determining from the mass and energy balance the presence of any smoke flows into downstream compartments. The method of controlling the propagation of smoke in a structure may further comprise storing the estimated temperature and concentration of the upper smoke layer of each compartment having a smoke source therein, and comparing the predicted smoke propagation path to a preferred smoke propagation path to determine if the predicted smoke propagation path is acceptable. Additionally, the method may further comprise providing proposed adjustments to structure mechanisms, modeling the propagation of smoke in the structure based on the proposed adjustments to produce a revised predicted smoke propagation path, and comparing the revised predicted smoke propagation path to the preferred smoke propagation path.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Certain examples are described below in conjunction with the included figures, wherein like reference numerals refer to like elements in the various figures, and wherein.

DETAILED DESCRIPTION

In order to simplify the modeling and predicted movement of smoke flows in a structure having multiple compartments, various combinations of assumptions and generalizations are made. According to the modeling method herein, except for smoke which is driven by a mechanical device, any smoke in a compartment flows upward and fills the upper space in the compartment until it reaches an air passage (or connection) leading out of the compartment, at which point the smoke may flow out of the compartment. Additionally and somewhat related to the first generalization, a compartment may be visualized as having two homogenous zones: an upper smoke layer, and a lower cool air layer zone beneath it. Also, any changes in pressure distribution within the cool air zones of compartments due to fire are often small and may at times be considered negligible. These assumptions, together or individually, significantly reduce the complexity and computational requirements of the smoke propagation model. Further, instead of solving multiple differential equations to determine the conditions of several compartments simultaneously, the propagation of smoke through a structure can be predicted more easily—and more quickly—by solving for the conditions in each compartment individually.

In one application, the method for modeling smoke propagation may be used to predict safe routes for ingress into and egress out of a structure. In another application, the rapid modeling capabilities of the method provide for the ability to adjust structure mechanisms so as to control the propagation of smoke through the structure. Further, the method for modeling smoke propagation may be embodied in a system, such as a fire panel, which may communicate to a user information generated by the model. Such a system may also communicate with a user to provide information regarding safe routes within a structure, or in order to manipulate model variables so as to control the propagation of smoke in a structure.

Figure 1:
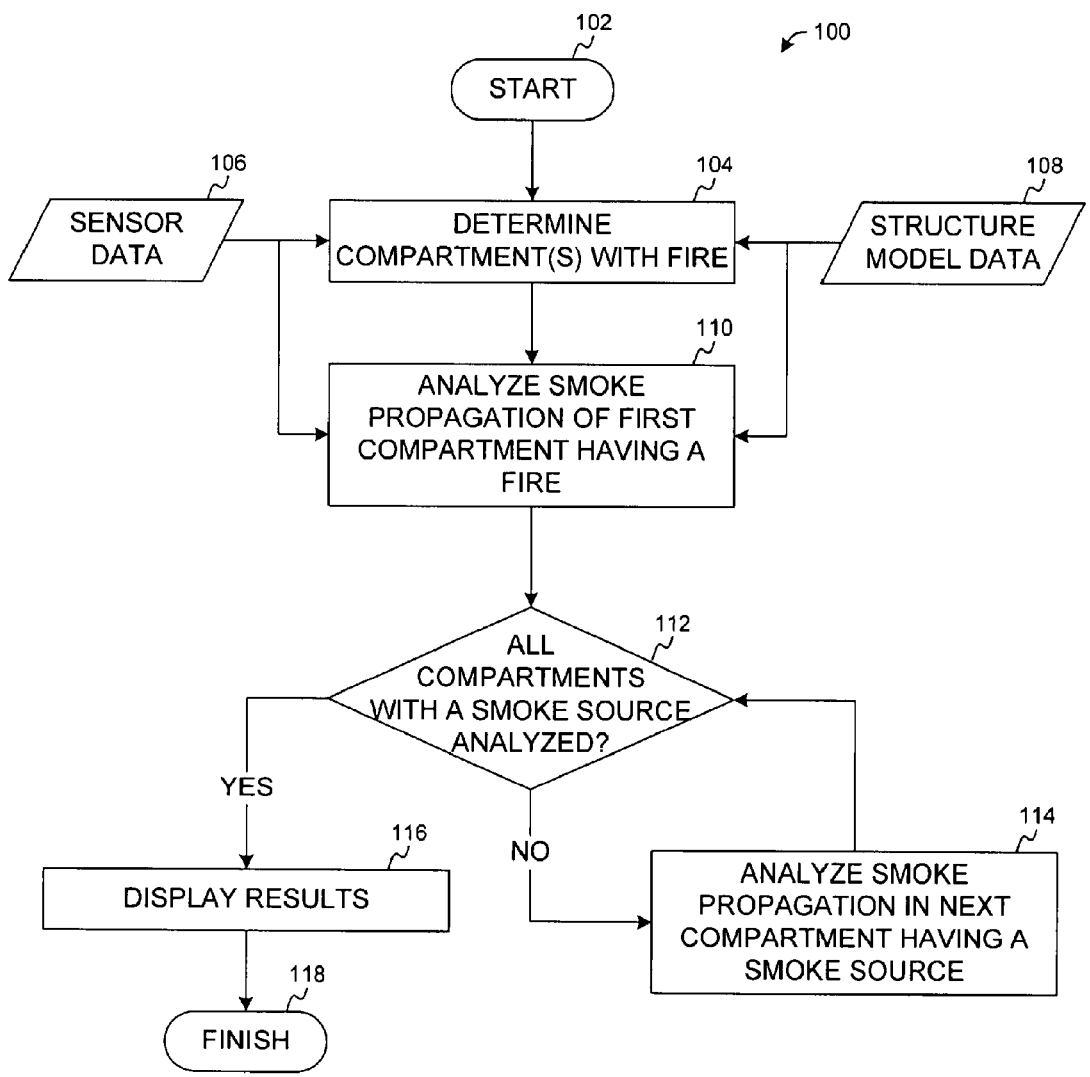
FIG. 1 is a flow chart illustrating a method for modeling the propagation of smoke in a building, according to an embodiment of the invention.

FIG. 1 provides an illustration of a method 100 for modeling the propagation of smoke in a structure having multiple compartments, according to an embodiment of the invention. The modeling method 100 may be utilized in a structure which has multiple compartments. The structure for which the propagation of smoke is to be modeled may have various sensors distributed throughout one or more internal locations and within the multiple compartments. These sensors may include thermometers, thermocouples, smoke sensors, barometers, and other measurement devices, and may collect a variety of sensor data 106, such as temperature, smoke density or concentration, and pressure. In addition, this sensor data 106 may include other information such as may be produced by fire detection and prevention sensors. This sensor data may further be received and processed by a central fire panel or other system designed to process and display the sensor data.

At 108 a model is provided of the structure for which the propagation of smoke is to be modeled. The model may provide a representation of the location of all relevant components located within the structure. Relevant components may include compartments (such as rooms, hallways, and other spaces), connections between compartments through which air may flow (such as doors, windows, and vents), and sensors (such as fire detectors, temperature sensors, and smoke sensors), for example. In one embodiment, each compartment may be represented in the model by two points in a three-dimensional space, where the two points define the diagonal of a rectangular box; the rectangular box defined by these two points may serve as an approximation for the actual three-dimensional space occupied by the compartment. In addition, the model may comprise various characteristics associated with each compartment, including, but not limited to: a list of connections to other spaces or compartments in the structure, air flows into and out of the space, sensor information (such as the type, location, and reading of the sensor), the properties of any combustible materials in the space, and the characteristics of the compartment interior construction materials. Further, each connection may be associated with dimensional information, such as its size and location, distance from ceiling, and type (vent, door, window, or the like).

With sensor data 106 and structure model data 108 provided, the smoke propagation modeling method 100 can be utilized to model the propagation of smoke and predict the smoke conditions within the structure during a prediction period. The smoke propagation modeling method proceeds at 104 by determining the location of one or more fires within the structure. The presence of the one or more fires may be determined through sensor data 106, which may include the compartment or compartments in which fire has been detected.

With the compartment or compartments with fires determined, a first compartment having a fire therein may be analyzed at 110 to ascertain the propagation of a smoke path through the compartment during the prediction period, and to determine the characteristics of the upper smoke layer in the compartment. The length of the prediction period my be provided by a user at the start of the modeling process, or may otherwise be predetermined. In general, each fire within the structure acts as a primary smoke source, generating a smoke plume that transfers energy and mass from the lower cool air layer into the upper smoke layer. These layers are assumed to be generally homogenous zones, delineated by a layer interface having a height above the floor of the compartment.

According to the modeling method 100, the smoke plume created by the fire initially produces changes only in the upper smoke layer of the compartment which houses the fire. However, as more smoke is produced by the fire, the volume, temperature, and density of the upper smoke layer may change such that one or more smoke flows out of the compartment are produced. Through these smoke flows a smoke path may propagate from one compartment and into one or more adjacent compartments. Where a smoke flow into an adjacent compartment is created, the compartment from which the smoke flow enters the connection may be termed the "upstream compartment" and the compartment into which the smoke flow is received may be termed the "downstream compartment." The properties of each smoke flow—such as temperature, density or concentration, and rate—may be estimated, and used to model the smoke flow as a smoke source (or smoke plume) for the downstream compartment. Acting as a smoke plume for the downstream compartment, the smoke flow may cause the volume, temperature, and density of the upper smoke layer of the downstream compartment to change such that additional smoke flows are produced. These additional smoke flows may further propagate the smoke path into additional downstream compartments. This pattern may repeat itself and the smoke path may propagate until a smoke flow is created into a compartment into which the smoke can not spread any further, such as a compartment whose only connection to other compartments is that through which a smoke flow is entering. For purposes of the modeling method, the spread of the smoke is also limited by the length of the propagation period, as further described below.

In determining whether a smoke flow is produced within a compartment, it is assumed that smoke within the compartment will flow upward to fill upper spaces within a compartment first, and accumulate in the ceiling of the compartment. Thus, over time plumes in the compartment will contribute to the volume of the upper smoke layer, resulting in a lowering layer interface. If the estimated height of the interface between the two layers does not fall to the height of any connection (such as a vent, door, or other opening) during the propagation modeling period, then no smoke flows out of the compartment are created. However, once the layer interface falls to the height of a connection, a smoke flow may be created which results in the flow of smoke through the connection and into the adjacent compartment joined by the connection. To determine the rate of the smoke flow (if any) into adjacent compartments, the upper smoke layer of the compartment is analyzed and a mass and energy balance is performed, as further described below.

Once the first compartment having a fire has been analyzed at 110, it is determined at 112 if any other compartments having smoke sources need to be analyzed, or whether such compartments have not been completely analyzed. Compartments having smoke sources may be those downstream compartments into which a smoke flow has been generated by another compartment, as determined at either 110 or 114. In addition, compartments having smoke sources may also include any other compartments which have fires therein, as determined at 104. According to the determination at 112, a compartment has not been fully analyzed if it has a smoke source therein for which the contribution of that smoke source to the upper layer of the compartment has not yet been evaluated. For example, where the smoke propagation through a compartment results in a smoke flow into a downstream compartment, the downstream compartment has not been fully analyzed if the smoke flow has not been evaluated for its effect on the upper smoke layer of the downstream compartment.

If it is determined at 112 that not all compartments having smoke sources have been completely analyzed, then the next compartment having a smoke source may be analyzed at 114 to determine the propagation of smoke through the compartment during the propagation period, including the characteristics of the upper smoke layer of the compartment. The next compartment to be analyzed may be chosen according to a variety of algorithms for traversing nodes, and the process 100 is not limited to any given algorithm. For the purposes of illustration only, the algorithm for selecting a next compartment may proceed by analyzing all downstream compartments of each upstream compartment prior to analyzing any other compartments.

If it is determined at 112 that all compartments with smoke sources have been completely analyzed, or that no such compartments exist, then the results of the computer model can be displayed at 116. The results may include the smoke layer characteristics of each compartment as determined in each compartment analysis at 110 or 114. For example, these smoke layer characteristics might include, but are not limited to, any combination of the temperature, density or concentration, height, volume, and enthalpy.

Figure 2:
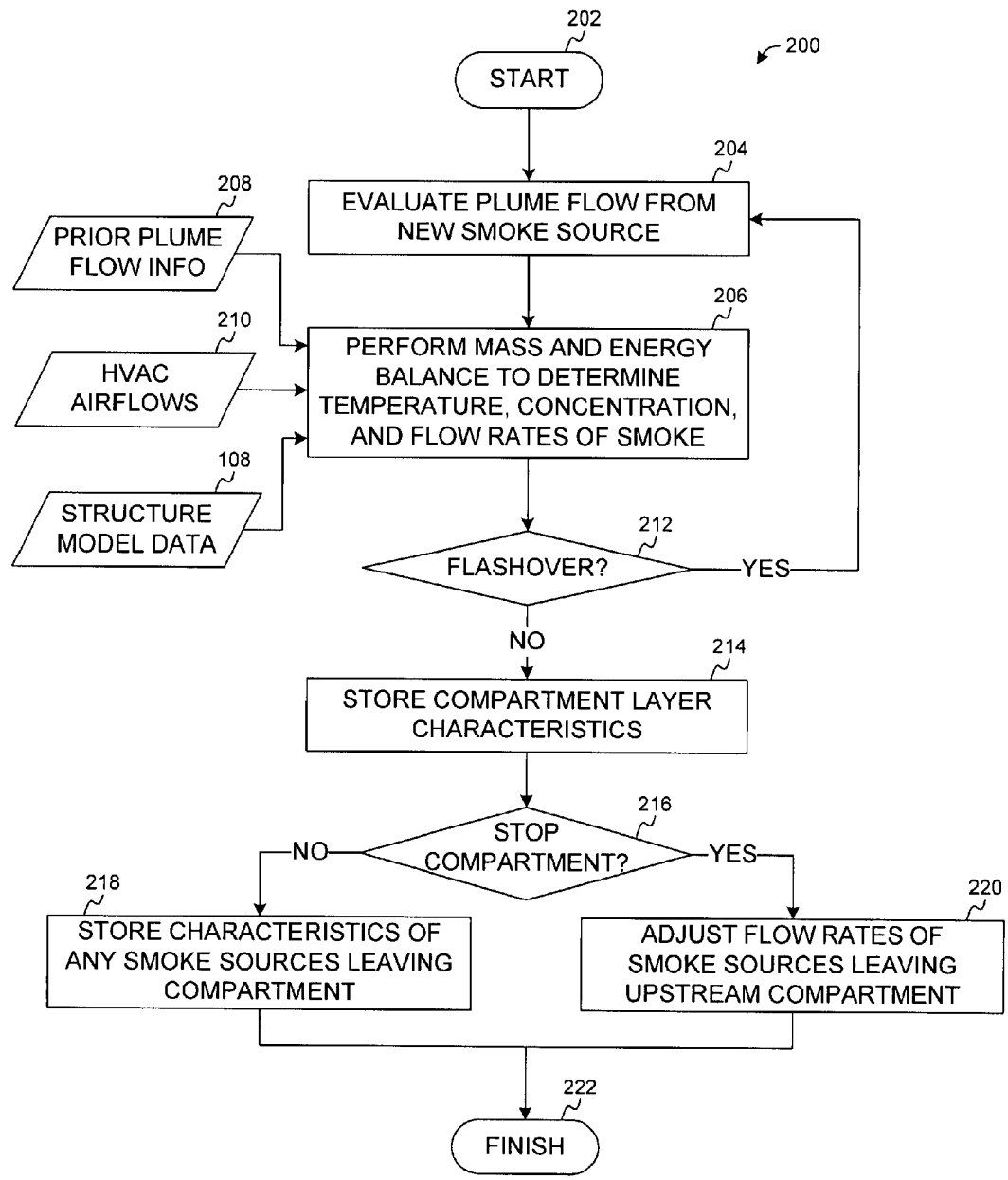
FIG. 2 is a flow chart illustrating a process for analyzing a smoke propagation in a compartment, according to an embodiment of the invention.

FIG. 2 provides a flow chart that illustrates a process 200 for analyzing smoke propagation within a compartment, according to an embodiment. This process may be used to analyze the propagation of smoke through compartments at steps 110 and 114 of process 100. For each compartment in which there is a smoke source (such as a smoke flow from an upstream compartment or a fire), the characteristics of the plume flow rate for the new smoke source in the compartment are estimated at 204. A new smoke source is any smoke source for the compartment which has not been analyzed, as through process 200. Those skilled in the art will know how to estimate the plume flow rate and its temperature from the energy release rate (ERR) within the compartment, the air mass entrainment, and the compartment configuration. Once the characteristics of the plume flow are determined at 204, they may be stored with other prior plume rate information 208 for any subsequent analysis of smoke propagation through the compartment.

Figure 3:
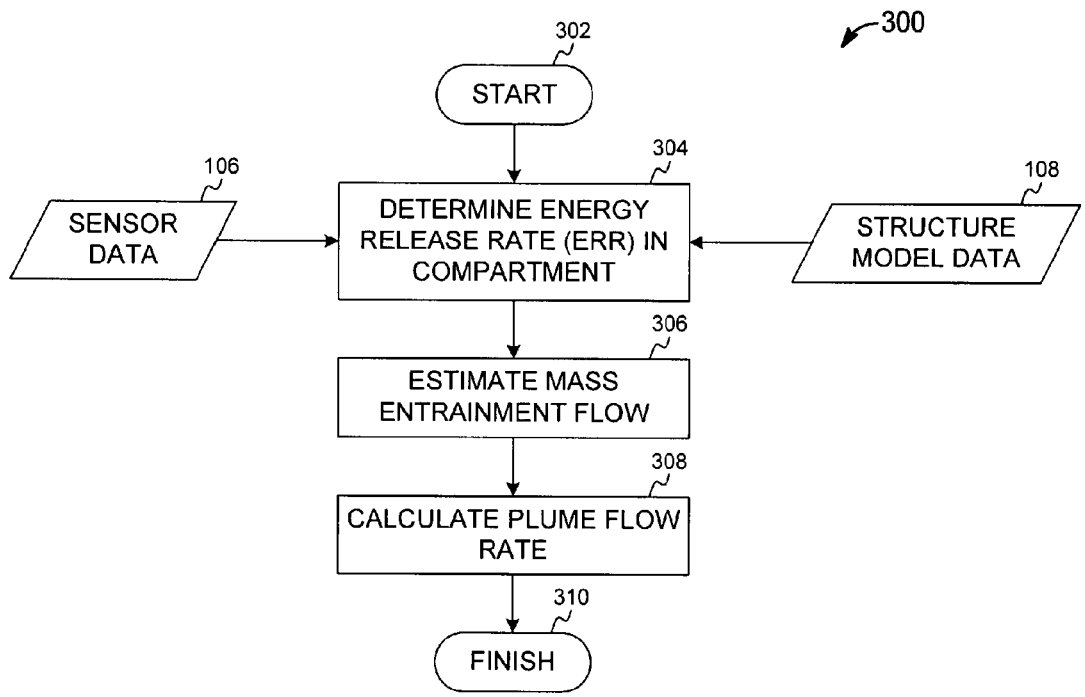
FIG. 3 is a flow chart illustrating a process for estimating plume flow rate for a compartment having a fire as a smoke source, according to an embodiment of the invention.

FIG. 3 provides a flow chart that illustrates a process 300 for estimating the plume flow rate in a compartment, according to an embodiment. First the ERR in the compartment is determined at 304. The method for determining the ERR of a smoke source depends on whether the source is a fire or a smoke outflow. Where the smoke source is a fire, the ERR may be estimated using one of several known methods, including, for example, the Sensor Driven Fire Model (SDFM) developed by the National Institute of Standards and Technology (NIST). Using the SDFM, ERR is determined through calculations using sensor readings, such as sensor data 106, and compartment configuration information, such as may be included in structure model data 108. Under the SDFM, calculations may be based upon either temperature readings or smoke concentration readings, or both. The primary equations utilized in the SDFM include the following:

$$Q_c = 0.172 H_1^{5/2} \left(\frac{r}{0.18 H_1}\right)^{0.345} \left(\frac{\Delta T_{cj}^{3/2}}{T_\infty^{1/2}}\right)$$

$$Q = \frac{Q_c}{1 - \chi_r}$$

where $Q_c$ is the convective energy release rate measured in kilowatts, Q is the total ERR measured in kilowatts, $H_1$ is the ceiling height above the fire surface measure in meters, r is the radial distance from the plume centerline measured in meters, $\Delta T_{cj}$ is the excess ceiling jet temperature measured in degrees Kelvin, $T\infty$ is the ambient temperature measured in degrees Kelvin, and $\chi_r$ is the radiative fraction of the fuel. Ceiling jet temperatures may be provided through sensor data 106, as may the ambient temperature. Alternatively, the ambient temperature may be set to a known or estimated value. Ceiling height and radial distance may be included in the structure model as characteristics of a compartment and its layout, while radiative fraction values may either be a characteristic of a compartment or a set value based on pre-determined estimates.

Alternatively, where the smoke source is a smoke flow from an upstream compartment the ERR may be estimated as the energy or enthalpy contained in the smoke flow. The energy contained in the smoke flow may be determined using known methods, and may be based upon the temperature, concentration, and flow rate of the smoke flow, or any combination of these characteristics, as further described below.

With the ERR of the smoke source is determined, the mass entrainment flow into the upper smoke layer can be determined at 306. Mass entrainment flow can be determined using any of several known methods, including, for example, the McCaffrey correlation which is guided by the following equations for the three types of smoke-producing sources:

Flaming $\quad \frac{\dot{m}_e}{Q_f} = 0.011 \left(\frac{Z}{Q_f^{2/5}}\right)^{0.566} \quad 0.00 \le \left(\frac{Z}{Q_f^{2/5}}\right) < 0.08$ Intermittent $\quad \frac{\dot{m}_e}{Q_f} = 0.026 \left(\frac{Z}{Q_f^{2/5}}\right)^{0.909} \quad 0.08 \le \left(\frac{Z}{Q_f^{2/5}}\right) < 0.20$ Plume $\quad \frac{\dot{m}_e}{Q_f} = 0.124 \left(\frac{Z}{Q_f^{2/5}}\right)^{1.895} \quad 0.20 \le \left(\frac{Z}{Q_f^{2/5}}\right)$ where Z is the entrainment height measured in meters, $Q_f$ is the total ERR of the smoke source measured in kilowatts, and $m_e$ is the air mass entrainment measured in kilograms per second. After determining the ERR and mass entrainment, and provided information regarding the compartment configuration, the plume flow rate and temperature can be calculated using known methods at 308.

As noted above, when the interface between the upper smoke layer and the lower cool air layer has fallen below the height of any connections within the room, smoke flows may be created into adjacent compartments. Referring again to FIG. 2, after the characteristics of the plume flow in the compartment has been estimated at 204, a mass and energy balance may be performed at 206 in order to estimate such variables as the temperature, concentration, enthalpy and flow rates of these smoke flows, as well as the temperature, concentration, enthalpy and volume of the upper smoke layer.

Methods of performing mass and energy balances in rooms containing fires are generally known in the art. The mass and energy balance performed in the compartment may include the effects of a variety of phenomena, such as smoke plumes (including those calculated at 204 or any previously calculated plumes 208), natural and mechanical air flows (including HVAC airflows 210), and convective and radiative heat loss to compartment walls, ceiling, floors, and openings. To estimate the heat losses, empirical relations may be used.

According to the mass and energy balance 206, the pressure of the lower cool air layer in each compartment is a known variable for the mass and energy balance. In one embodiment, the pressure of the lower cool air layer may be held to a constant value. In another embodiment, how the pressure of the lower cool air layer changes over time may be known, and this pressure changes over time may be modeled as a time-varying equation.

Further, according to an embodiment, the mass and energy balance 206 also varies for a compartment that becomes a "stop compartment" for the propagation of smoke through the structure. According to the modeling method, a stop compartment is a compartment through which smoke can flow in but cannot flow out, but for mechanically induced flow. Such a compartment may comprise a compartment whose only connections are those through which smoke sources are currently flowing into the compartment. Further, a stop compartment may be a compartment whose downstream compartments are all stop compartments. In a stop compartment, the mass and energy balance will proceed normally until the height of the layer interface of the stop compartment becomes lower than that of the upstream compartment through which it receives a smoke flow. At that point, the mass and energy balance is modified to maintain the layer height of the stop compartment consistent with that of the upstream compartment, and the smoke flow into the downstream compartment will be reduced accordingly, notwithstanding any mechanically induced flow (such as may be provided by HVAC systems). The reduction in the smoke flow into the downstream compartment will be reflected as an overall increase in the smoke flows of the upstream compartment into its other downstream compartments. The apportionment of the overall increase, or surplus smoke flow, to the individual smoke flows into the other downstream compartments may be calculated proportionately to the dimensions of the respective connections between the upstream compartment and the other downstream compartments. Further, for any of the other downstream compartments that have previously been analyzed at 114 and according to the smoke propagation process 200, the increase of the smoke flow may be modeled as a new smoke source for determinations made at 112 and the subsequent analysis at 114.

Where multiple smoke sources feed into a compartment, as in the case where a compartment receives multiple smoke flows from upstream compartments, the changes in mass and energy resulting from each smoke flow are considered additive. Accordingly, the number and characteristics of any smoke flows entering a compartment do not need to be determined simultaneously in order to determine the characteristics of the upper smoke layer and lower cool air layer. Rather, based on the start time and change time of a smoke flow entering a compartment, subsequently determined smoke flows entering a compartment may be analyzed according to their additive contribution to changes in mass and energy of the layers, and to the development of other smoke flows.

When combined with structural and other parameters of the compartment, the results of the mass and energy balance 206 may provide several estimated characteristics of the upper smoke layer. Such characteristics may include the temperature, concentration, mass, energy or enthalpy, and volume of the upper smoke layer. Similar characteristics for the lower cool air layer may also be determined. The height of the layer interface may be indicated by the volume of the upper smoke layer, since the dimensions of the compartment are provided in the structure model data 108. The temperature of the upper smoke layer may be estimated using known methods, and may be based on the dimensions of connections in the room, the ERR of the smoke sources in the room, and the thermal inertia, thermal conductivity, and thickness of the compartment interior construction materials. For the purposes of illustration, one known equation for determining the change in the temperature of the upper smoke layer is:

$$\Delta T(C) = 6.85 \left[ \frac{\dot{Q}^2}{(hA)A_o \sqrt{H_o}} \right]^{1/3}$$

where $A_o$ is the cross-sectional area of the connection opening in square meters, $H_o$ is the height of the connection opening in meters, A is the interior surface area of the connection in square meters, Q is the ERR of the smoke source in the compartment, and h is the heat loss coefficient. The value of h is provided by the following equation:

$$h = \text{Maximum of} \left( \sqrt{\frac{k\rho c}{t}} \text{ or } \frac{k}{l} \right)$$

where kpc is the thermal inertia of the compartment interior construction material, k is the thermal conductivity compartment interior construction material, and l is the compartment interior construction material thickness in meters, and t is time in seconds. The above equations for determining the change in the temperature of the upper smoke layer can be used for a compartment having multiple vents by summing the $A_o(H_o)^{1/2}$ values. Additionally, the above equations can be used for a compartment having different construction materials by summing the hA values for the various wall, ceiling and floor elements. Additional information can be found in J.G. Quintire, Principles of Fire Behavior, Chapter 9 Compartment Fires, pp. 185-187, Delmar Publishers, Albany, N.Y. 1998.

In one embodiment, once the temperature of the upper smoke layer has been estimated, it may be determined at 212 if a flashover has occurred in the compartment. A flashover involves a rapid change of conditions within a compartment that may result in the development of fire within the compartment. Various methods and characteristics may be utilized to determine a flashover event. For example, a flashover may be determined where the upper smoke layer temperature exceeds a certain temperature threshold, such as 500° C. Alternatively, or in combination, a flashover may be determined where the sensor temperature in a compartment exceeds the upper smoke layer temperature by a certain percent threshold, such as 130%. Similarly, a flashover may be determined where the sensor-provided smoke concentration in a compartment exceeds the smoke concentration of the upper layer by a certain percent threshold, such as 130%. Additionally, other known methods may be used to determine the presence of a flashover.

If a flashover is determined to have occurred, it is assumed that a fire has developed within the compartment, which will serve as an additional source of fire and smoke for the compartment. The ERR due to the flashover can be estimated using known methods, and according to the characteristics of the combustible contents in the compartment. The smoke flow generated by this new smoke source may then be analyzed at 204 for its contribution to changes in the characteristics of the upper smoke layer. Accordingly, the characteristics of the smoke plume from this newer fire may be estimated according to the steps provided in process 300 and described above. Specifically, an estimated ERR and smoke release rate of the fire may be estimated, which may then be utilized to determine the characteristics of the smoke plume created by the fire. According to the model, the changes in mass and energy resulting from this new smoke plume are additive to those resulting from previously-analyzed smoke sources, and can be used to provide updated estimates regarding the characteristics of the layers in the compartments at 206.

The characteristics of the upper smoke layer in the compartment may then be stored, as in a memory, at 214. Where an additional smoke source feeds into the compartment for which the layer characteristics have previously been determined, the stored characteristics may then be used in subsequent mass and energy balances to produce updated estimates of the compartment layer characteristics.

In addition to storing the upper layer characteristics of the compartment, information regarding smoke flows, as determined through the mass and energy balance 206, may also be stored. Changes in smoke flows may depend on whether the current compartment was determined to be a stop compartment during the mass and energy balance. Where the compartment is not a stop compartment, smoke flow information for any smoke flows into downstream compartments may be stored at 218. These smoke flows may serve as new smoke sources for determinations made at 112, and the information associated with these smoke sources may be used during any subsequent analysis at 114. Alternatively, where the compartment is a stop compartment, the flow rates of the smoke sources flowing out of the upstream compartment may be modified at 220, in accordance with the methods previously described above.

After the smoke propagation in a compartment has been analyzed in accordance with process 200, the presence of one or more new smoke sources may be determined. Each compartment into which a new smoke has been generated is then analyzed according to process 200 until each compartment having a smoke source therein has been analyzed and modeled over the duration of the propagation period.

Figure 4:
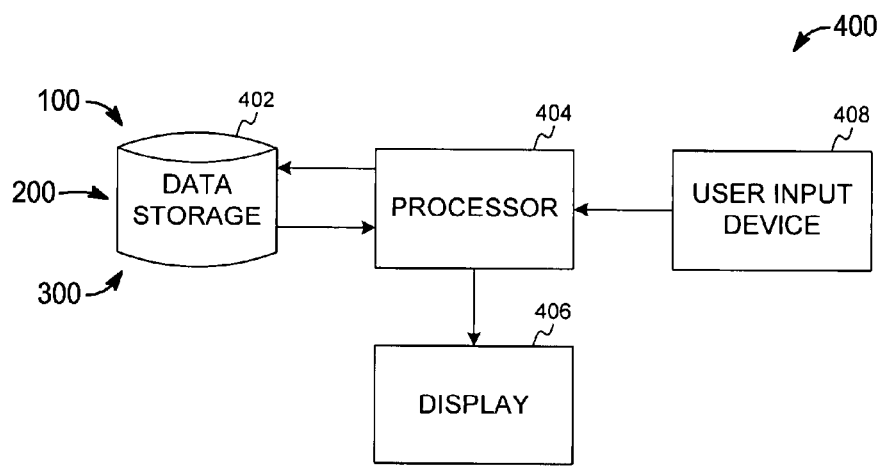
FIG. 4 is a schematic of a processing system capable of carrying out a method for modeling the propagation of smoke in a building, according to an embodiment of the invention.

The method for modeling the propagation of smoke provided above in processes 100, 200, and 300 may also be embodied as software and performed via a processing system, as illustrated in FIG. 4. The system 400 may comprise a data storage 402 that contains coded steps for carrying out the method for modeling the propagation of smoke, and whose coded steps can be interpreted and performed by a processor 404. Additionally, the data storage 402 may comprise structure model data 108. Alternatively, the structure model data 402 may be provided by another data source. The data storage 402 may also receive and store the results of the method for modeling the propagation of smoke, such as the upper smoke layer characteristics of each compartment in the structure. The processor may also be capable of receiving sensor data and HVAC air flow information, in order to perform processes 100, 200, and 300.

The system 400 may also include a user input device, which may be used to interact with the processor or to input various data associated with the method for modeling the propagation of smoke. In order to provide communication to the user, a display 406 may be communicably coupled to the processor 404. The display 406 may provide a visual display of the results of the method for modeling the propagation of smoke.

Figure 5:
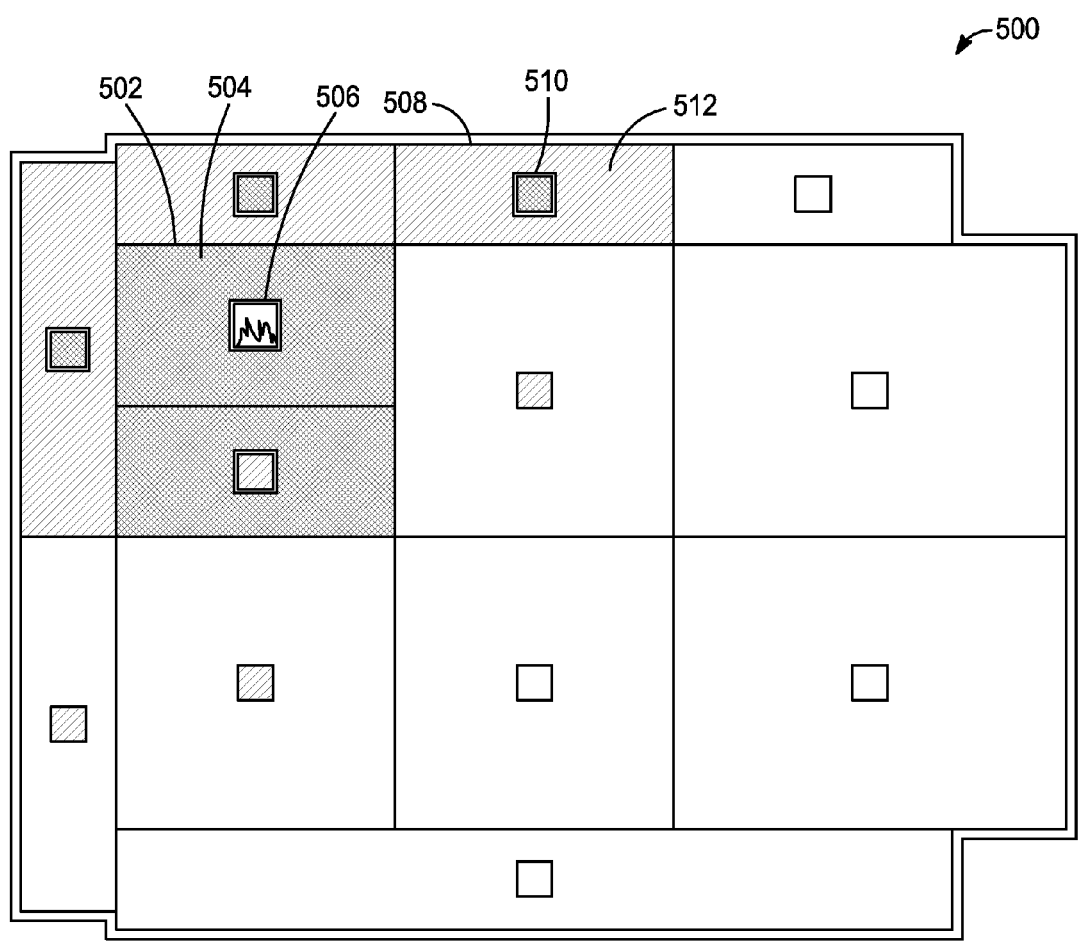
FIG. 5 is an illustration of a graphical representation of the smoke temperature and density for each compartment in a structure, according to an embodiment of the invention.

FIG. 5 provides an illustration of a visual display of the results produced by the method for modeling the propagation of smoke, according to an embodiment. The visual display of the structure 500 may include various compartments, such as 502 and 508, which provide a general representation of an actual layout of compartments within the structure. In addition, each compartment may comprise visual indicators that represent the characteristics of the upper smoke layer in that compartment. According to one embodiment, each structure may include an indicator of smoke temperature 504 and 512, and an indicator of smoke concentration 510. Where it is determined by the modeling method above that a compartment contains a fire therein, the visual display may provide a separate indicator 506 to communicate this condition to the user.

Figure 6:
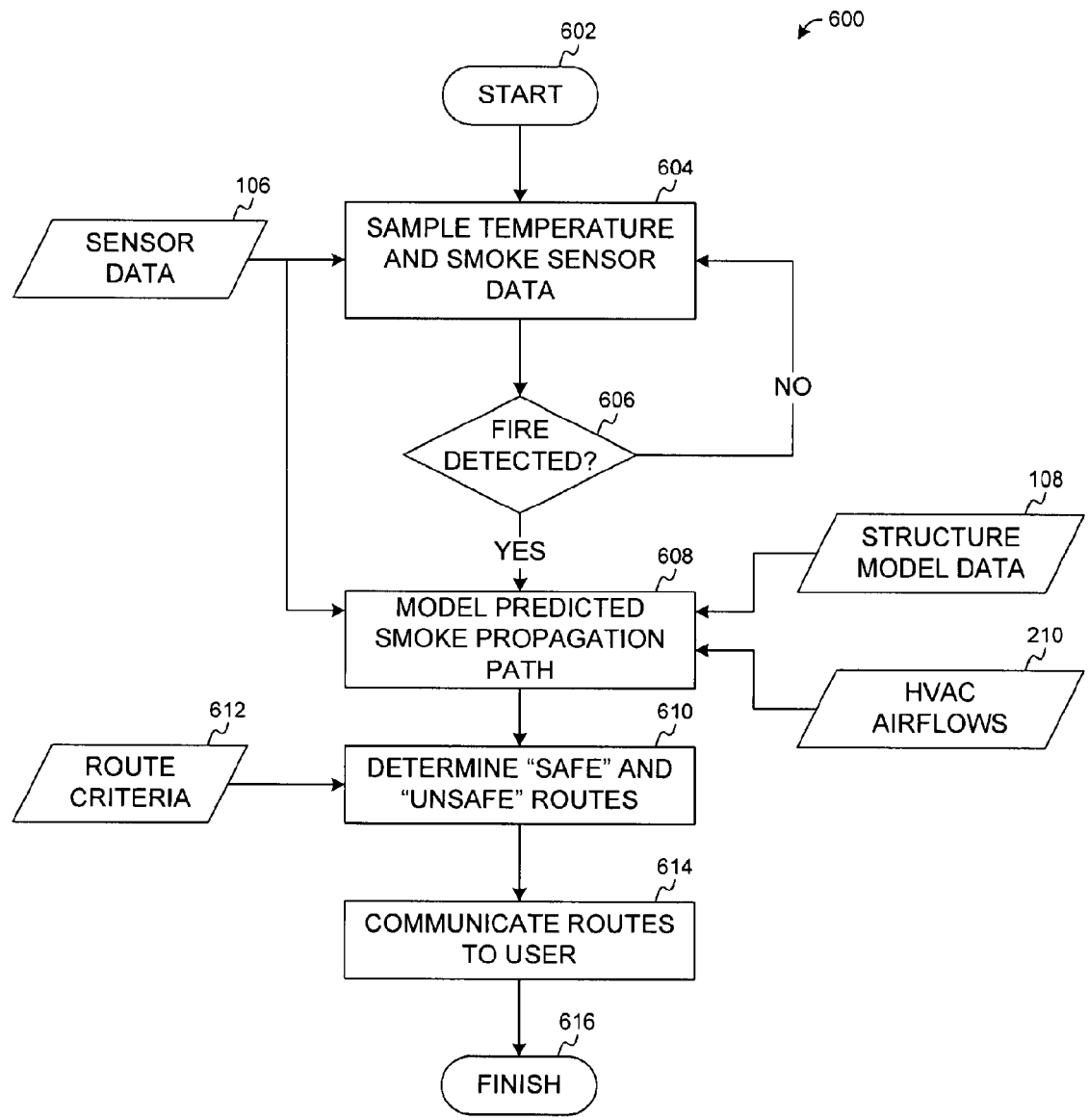
FIG. 6 is a flow chart illustrating a process for utilizing a smoke propagation model to predict safe routes within a structure, according to an embodiment of the invention.

The above method for modeling the propagation of smoke in a structure provided, in part, in processes 100, 200, and 300 may be utilized for various applications that can benefit from real-time predictions of smoke propagation. FIG. 6 provides a flow chart illustrating a process 600 for utilizing a smoke propagation model to predict safe routes within a structure. At 604, the process is in a steady-state mode of monitoring available sensor data 106. Periodically, the sensor data 106 is analyzed at 606 to determine whether a fire has been detected in the structure. If no fire is detected, the process returns to 604 and monitoring the sensor data 106.

If the sensor data 106 indicates that a fire has been detected, however, then the process moves to modeling a predicted smoke propagation path for the smoke generated by the fire 608. The predicted smoke propagation path is modeled according to processes 100, 200, 300 and other aspects of the modeling method described above, and relies upon sensor data 106, structure model data 108, and HVAC airflows 210. Modeling at step 608 results in estimated smoke conditions for the structure compartments at a desired prediction time limit. For example, the model may produce a predicted smoke propagation path for 10 minutes from the latest sensor data readings. As noted above, the estimated smoke conditions produced by the model may include the smoke layer concentration and temperature, and the layer interface height (or smoke layer volume) for each compartment in the structure. Additionally, the model may predict which compartments are likely to contain fires at the end of the desired prediction time limit.

Once the predicted smoke propagation path has been modeled at 608, one or more "safe" routes into or out of the structure may be determined at 610. A "safe" route may be determined according to various pre-determined route criteria 612, which may include maximum smoke layer temperatures, maximum smoke layer concentrations, or minimum layer interface heights. Only those compartments that meet the specified route criteria 612 are considered safe compartments and may be utilized as a portion of the determined safe route. Utilizing known connections between compartments provided by the structure model data 108, one or more safe routes may be selected from the safe compartments according to known methods for planning evacuation and ingress routes. For example, the ingress and egress routes may be determined according to U.S. patent application Ser. No. 10/735,363, "BUILDING EMERGENCY PATH FINDING SYSTEMS AND METHOD," the specification of which is incorporated herein by reference. Alternatively, step 608 may proceed by first identifying and excluding "unsafe" routes and then determining safe ingress and egress routes according to methods disclosed in U.S. patent application Ser. No. 11/447,639, "TIME-DEPENDENT CLASSIFICATION AND SIGNALING OF EVACUATION ROUTE SAFETY," the specification of which is incorporated herein by reference.

After the one or more safe routes are determined at 610, they may be communicated to a user at 614 through, for example, a display. Such a display might include a visual representation of the structure as a three-dimensional or two-dimensional structure, with the one or more safe routes visually highlighted. Alternatively, if no safe routes are calculated at 610, this can also be communicated to the user. In one embodiment, the safe routes may be communicated to persons actually located within the structure via, for example, directional lighting sources or audible sources located throughout the structure. In another embodiment, the safe route may be signaled via the methods and systems provided in U.S. patent application Ser. No. 11/447,639, "TIME-DEPENDENT CLASSIFICATION AND SIGNALING OF EVACUATION ROUTE SAFETY." In another embodiment, the process 600 for predicting safe routes within a structure may be embodied in a particular processing system and display, such as a fire panel communicably coupled with the sensors of the structure and able to receive sensor data 106 from the sensors.

The method 600 for predicting safe routes in a structure may also be adaptive in nature through continuous updates on predicted safe routes based on sensor data 106. After one or more safe routes are initially communicated to a user at 614, the process may continue to model predicted smoke propagation paths 608, evaluate the model results to determine safe routes 610, and then communicate the one or more safe routes to the user 614.

Figure 7:
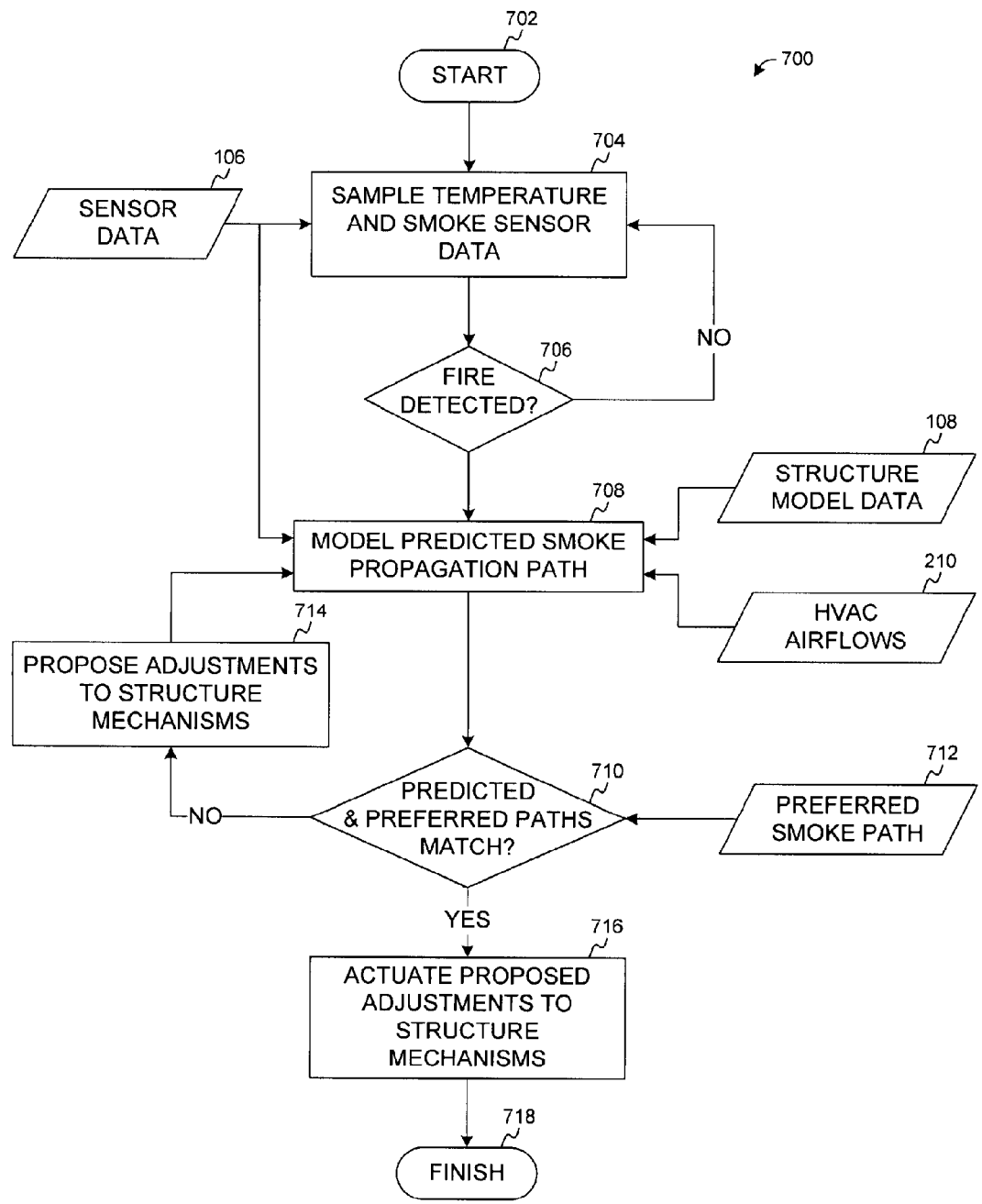
FIG. 7 is a flow chart illustrating a process for utilizing a smoke propagation model to control smoke propagation, according to an embodiment of the invention.

The method for modeling the propagation of smoke in a structure provided above may also be utilized to control the spread of smoke in a building. FIG. 7 provides a flow chart illustrating a process 700 for utilizing a smoke propagation modeling method to control smoke propagation, according to an embodiment of the invention. At 704, the process is in a steady-state mode of monitoring available sensor data 106. Periodically, the sensor data 106 is analyzed at 706 to determine whether a fire has been detected in the structure. If no fire is detected, the process simply returns to 704 and monitoring the sensor data 106.

If the sensor data 106 indicates that a fire is present, however, then the process moves to modeling a predicted smoke propagation path for the smoke generated by the fire 708. The predicted smoke propagation path is modeled according to processes 100, 200, 300 and other aspects of the method described above, and relies upon sensor data 106, structure model data 108, and HVAC airflows 210. Modeling at step 708 results in estimated smoke conditions for the structure compartments at a desired prediction time limit. For example, the model may produce a predicted smoke propagation path for 10 minutes from the latest sensor data readings. As noted above, the estimated smoke conditions produced by the model may include the smoke layer concentration and temperature, and the layer interface height for each compartment in the structure. Additionally, the model may predict which compartments are likely to contain fires at the end of the desired prediction time limit.

Once the predicted smoke propagation path has been modeled at 708, it may be compared to a pre-determined preferred smoke path 712. Such a preferred smoke path 712 may be determined according to various criteria including, but not limited, the following considerations. For example, the preferred smoke path may be determined such that smoke does not enter compartments containing critical structure components, personnel, or valuable equipment. In addition, the preferred smoke path may be determined in order to avoid smoke propagation into compartments along desired evacuation routes. Alternatively, the preferred smoke path may be determined so as to force the smoke into certain fire-equipped compartments, such as those with smoke ventilation equipment.

The preferred smoke path 712 and the predicted smoke path created by the model at 708 are then compared at 710. This comparison may be performed automatically by a system, or may be performed by a user. In the case that the comparison is performed by a user, a display of the predicted smoke path may be provided to the user, who may then determine whether the predicted smoke path is acceptable when compared to a preferred smoke path.

If the preferred smoke path 712 and the predicted smoke path created by the model at 708 are not substantially similar, a series of proposed adjustments to structure mechanisms may be provided. Such adjustments may include, but are not limited to: changes to HVAC systems in order to restrict or increase air flow in certain compartments, activation of certain smoke ventilation systems, the opening and closing of certain connections (such as windows, fire doors, and the like), or other fire protection and smoke control mechanisms. The adjustments may be proposed by a user, such as a building manager, and may be provided to the system using input means.

Once the proposed adjustments to structure mechanisms have been provided in 714, they may be provided as an input for a revised model of predicted smoke propagation at 708. Modeling will then proceed with the assumption that the adjustments proposed at 714 have been implemented, and a revised predicted smoke propagation path based on these adjustments will then be produced. Again, the predicted smoke propagation path will be compared to the preferred smoke path 712. If the comparison is unacceptable, additional adjustments to building mechanisms may be proposed and the modeling process of 708 may be repeated until an acceptable comparison is finally reached at 710. Once an acceptable comparison between the predicated smoke path and the preferred smoke path 712, then the proposed adjustments may be actuated at 716.

From the foregoing, it will be observed that numerous variations and modifications may be effected without departing from the spirit and scope of the invention as described above. It is to be understood that no limitation with respect to the specific methods or processes illustrated herein is intended or should be inferred. For example, process steps which have been included for illustrative purposes may not be necessary for accomplishing the intended results. Similarly, process steps need not be performed exactly in the order illustrated, and multiple process steps may be executed in parallel. In addition, it is understood that various presently unforeseen or unanticipated alternatives, modifications, variations or improvements may be subsequently made by those skilled in the art, which are intended to be encompassed by the following claims and those equivalents to which they are entitled.

The invention claimed is:

1. A method for searching an acceptable predicted smoke propagation path in a structure comprising:
   providing a model of the structure, wherein the model comprises:
   a multiplicity of compartments, each compartment comprising (i) an upper smoke layer having an associated temperature and concentration, and (ii) a lower cool air layer having an associated pressure; and
   a multiplicity of connections between one or more of said compartments, each connection describing air flow from an upstream compartment to one or more downstream compartments;
   receiving sensor data indicating one or more compartments as having a fire therein;
   analyzing a propagation of smoke in each compartment having a smoke source therein, wherein the smoke source is one of either a fire or a smoke flow, and wherein analyzing the propagation of smoke comprises:
   evaluating a plume flow of the smoke source therein;
   performing a mass and energy balance based on the plume flow to provide an estimated temperature and concentration of the upper smoke layer of the compartment, wherein the pressure of the lower cool air zone of the compartment is known; and
   determining a predicted smoke propagation path from the mass and energy balance based on the presence of any smoke flows into downstream compartments by solving for conditions in each compartment individually;
   storing the estimated temperature and concentration of the upper smoke layer of each compartment having a smoke source therein;
   updating the estimated temperature and concentration of the upper smoke layer of each compartment based on updated sensor data; and
   comparing the predicted smoke propagation path to a preferred smoke propagation path to determine if the predicted smoke propagation path is acceptable, wherein the preferred smoke propagation path is designed to control the propagation of smoke according to control criteria, wherein if the predicted smoke propagation path is not acceptable:
   providing proposed adjustments to structure mechanisms to modify propagation of smoke;
   modeling the propagation of smoke in the structure based on the proposed adjustments to produce a revised predicted smoke propagation path; and
   comparing the revised predicted smoke propagation path to the preferred smoke propagation path.

2. The method of claim 1 wherein evaluating a plume flow comprises estimating an energy release rate (ERR) and smoke release rate of the fire if the smoke source is a fire, and estimating an enthalpy and concentration of the smoke flow if the smoke source is a smoke flow.

3. The method of claim 2 wherein each of said multiplicity of compartments comprises information on room structure and combustible room contents, and wherein estimating the ERR comprises combining said sensor data with the information on room structure and combustible room contents of a compartment.

4. The method of claim 1 wherein analyzing the propagation of smoke further comprises determining whether a flashover has occurred in the compartment.

5. The method of claim 4 wherein determining whether a flashover has occurred comprises determining whether the temperature of the upper smoke layer exceeds a threshold temperature.

6. The method of claim 1 wherein performing the mass and energy balance further comprises:
   receiving HVAC airflow data; and
   estimating a smoke flow rate for each smoke flow using said HVAC airflow data.

7. The method of claim 1 wherein, for a compartment having multiple smoke sources, the mass and energy balances are additive.

8. The method of claim 1 further comprising displaying the temperature and concentration of the upper smoke layer of each compartment having a smoke source therein.

9. The method of claim 1 wherein each compartment further comprises a layer interface between the upper smoke layer and the lower cool air layer, and wherein performing a mass and energy balance provides an estimated height of the layer interface.

10. The method of claim 9 further comprising reducing the smoke flow into a compartment such that the height of the layer interface of the compartment does not fall below the height of the layer interface of any of the upstream compartments of the compartment, notwithstanding mechanically driven smoke flow.

11. The method of claim 9 further comprising storing the height of the layer interface of each compartment.

12. The method of claim 1 further comprising displaying on a display the estimated temperature and density of the upper smoke layer of each compartment.

13. The method of claim 1 wherein performing the mass and energy balance further comprises determining if the compartment is a stop compartment.

14. A computer-readable storage device having computer readable instructions executable by a computer such that, when executing said instructions, a computer will perform the steps of:
providing a model of a structure, wherein the model comprises:
a multiplicity of compartments, each compartment comprising (i) an upper smoke layer having an associated temperature and concentration, and (ii) a lower cool air layer having an associated pressure; and
a multiplicity of connections between one or more of said compartments, each connection describing air flow from an upstream compartment to one or more downstream compartments;
receiving sensor data indicating one or more compartments as having a fire therein;
analyzing a propagation of smoke in each compartment having a smoke source therein, wherein the smoke source is one of either a fire or a smoke flow, and wherein analyzing the propagation of smoke comprises:
evaluating a plume flow of the smoke source therein;
performing a mass and energy balance based on the plume flow to provide an estimated temperature and concentration of the upper smoke layer of the compartment, wherein the pressure of the lower cool air zone of the compartment is known; and
determining a predicted smoke propagation path from the mass and energy balance based on the presence of any smoke flows into downstream compartments by solving for conditions in each compartment individually;
storing the estimated temperature and concentration of the upper smoke layer of each compartment having a smoke source therein;
updating the estimated temperature and concentration of the upper smoke layer of each compartment based on updated sensor data; and
comparing the predicted smoke propagation path to a preferred smoke propagation path to determine if the predicted smoke propagation path is acceptable, wherein the preferred smoke propagation path is designed to control the propagation of smoke according to control criteria, wherein if the predicted smoke propagation path is not acceptable:
providing proposed adjustments to structure mechanisms to modify propagation of smoke;
modeling the propagation of smoke in the structure based on the proposed adjustments to produce a revised predicted smoke propagation path; and
comparing the revised predicted smoke propagation path to the preferred smoke propagation path.

15. The computer-readable storage device of claim 14 wherein estimating a plume flow comprises estimating an energy release rate (ERR) and smoke release rate of the fire if the smoke source is a fire, and estimating an enthalpy and concentration of the smoke flow if the smoke source is a smoke flow.

16. The computer-readable storage device of claim 15 wherein each of said multiplicity of compartments comprises information on room structure and combustible room contents, and wherein estimating the ERR comprises combining said sensor data with the information on room structure and combustible room contents of a compartment.

17. The computer-readable storage device of claim 14 wherein analyzing the propagation of smoke further comprises determining whether a flashover has occurred in the compartment.

18. The computer-readable storage device of claim 17 wherein determining whether a flashover has occurred comprises determining whether the temperature of the upper smoke layer exceeds a threshold temperature.

19. The computer-readable storage device of claim 14 wherein performing the mass and energy balance further comprises:
receiving HVAC airflow data; and
estimating a smoke flow rate for each smoke flow using said HVAC airflow data.

20. The computer-readable storage device of claim 14 wherein, for a compartment having multiple smoke sources, the mass and energy balances are additive.

21. The computer-readable storage device of claim 14 further comprising displaying the temperature and concentration of the upper smoke layer of each compartment having a smoke source therein.

22. The computer-readable storage device of claim 14 wherein each compartment further comprises a layer interface between the upper smoke layer and the lower cool air layer, and wherein performing a mass and energy balance provides an estimated height of the layer interface.

23. The computer-readable storage device of claim 22 further comprising reducing the smoke flow into a compartment such that the height of the layer interface of the compartment does not fall below the height of the layer interface of any of the upstream compartments of the compartment, notwithstanding mechanically driven smoke flow.

24. The computer-readable storage device of claim 22 further comprising storing the height of the layer interface of each compartment.

25. The computer-readable storage device of claim 14 further comprising displaying on a display the estimated temperature and density of the upper smoke layer of each compartment.

26. The computer-readable storage device of claim 14 wherein performing the mass and energy balance further comprises determining if the compartment is a stop compartment.

27. A system for searching an acceptable predicted smoke propagation path in a structure comprising:
a processor;
storage means communicably coupled to the processor, and having processor-readable instructions executable by the processor such that, when executing said instructions, the processor will perform the steps of:
providing a model of the structure, wherein the model comprises a multiplicity of compartments, each compartment comprising (i) an upper smoke layer having an associated temperature and concentration, and (ii) a lower cool air layer having an associated pressure; and a multiplicity of connections between one or more of said compartments, each connection describing air flow from an upstream compartment to one or more downstream compartments;
receiving sensor data indicating one or more compartments as having a fire therein;
analyzing a propagation of smoke in each compartment having a smoke source therein, wherein the smoke source is one of either a fire or a smoke flow, and wherein analyzing the propagation of smoke comprises:
evaluating a plume flow of the smoke source therein;
performing a mass and energy balance based on the plume flow to provide an estimated temperature and concentration of the upper smoke layer of the compartment, wherein the pressure of the lower cool air zone of the compartment is known; and
determining a predicted smoke propagation path from the mass and energy balance based on the presence of any smoke flows into downstream compartments by solving for conditions in each compartment individually;
storing the estimated temperature and concentration of the upper smoke layer of each compartment having a smoke source therein;
a display connected to the processor for displaying a visual representation of the model of the structure, and for displaying the estimated temperature and concentration of the upper smoke layer of each compartment having a smoke source therein;
updating the estimated temperature and concentration of the upper smoke layer of each compartment based on updated sensor data; and
comparing the predicted smoke propagation path to a preferred smoke propagation path to determine if the predicted smoke propagation path is acceptable, wherein the preferred smoke propagation path is designed to control the propagation of smoke according to control criteria, wherein if the predicted smoke propagation path is not acceptable:
providing proposed adjustments to structure mechanisms to modify propagation of smoke;
modeling the propagation of smoke in the structure based on the proposed adjustments to produce a revised predicted smoke propagation path; and
comparing the revised predicted smoke propagation path to the preferred smoke propagation path.

28. A method of adaptively planning safe routes in a structure comprising:
detecting the presence of a fire in the structure;
modeling a propagation of smoke in the structure, wherein modeling the propagation of smoke comprises the steps of:
providing a model of the structure, wherein the model comprises a multiplicity of compartments, each compartment comprising (i) an upper smoke layer having an associated temperature and concentration, and (ii) a lower cool air layer having an associated pressure; and a multiplicity of connections between one or more of said compartments, each connection describing air flow from an upstream compartment to one or more downstream compartments;
receiving sensor data indicating one or more compartments as having a fire therein;
analyzing the propagation of smoke in each compartment having a smoke source therein, wherein the smoke source is one of either a fire or a smoke flow, and wherein analyzing the propagation of smoke comprises evaluating a plume flow of the smoke source therein;
performing a mass and energy balance based on the plume flow to provide an estimated temperature and concentration of the upper smoke layer of the compartment, wherein the pressure of the lower cool air zone of the compartment is known;
determining a predicted smoke propagation path from the mass and energy balance based on the presence of any smoke flows into downstream compartments by solving for conditions in each compartment individually; and
storing the estimated temperature and concentration of the upper smoke layer of each compartment having a smoke source therein;
comparing the predicted smoke propagation path to a preferred smoke propagation path to determine if the predicted smoke propagation path is acceptable, wherein the preferred smoke propagation path is designed to control the propagation of smoke according to control criteria, wherein if the predicted smoke propagation path is not acceptable:
providing proposed adjustments to structure mechanisms to modify propagation of smoke;
modeling the propagation of smoke in the structure based on the proposed adjustments to produce a revised predicted smoke propagation path; and
comparing the revised predicted smoke propagation path to the preferred smoke propagation path;
identifying one or more safe routes within the structure based on known route criteria, acceptable predicted smoke propagation path, and updated sensor data; and
communicating to a user the one or more safe routes.

29. A method of searching an acceptable predicted smoke propagation path in a structure comprising:
detecting the presence of a fire in the structure;
modeling the propagation of smoke in the structure to create a predicted smoke propagation path, which identifies a first path of the smoke through the structure, wherein modeling the predicted smoke propagation path comprises the steps of:
providing a model of the structure, wherein the model comprises a multiplicity of compartments, each compartment comprising (i) an upper smoke layer having an associated temperature and concentration, and (ii) a lower cool air layer having an associated pressure; and a multiplicity of connections between one or more of said compartments, each connection describing air flow from an upstream compartment to one or more downstream compartments;
receiving sensor data indicating one or more compartments as having a fire therein;
analyzing the propagation of smoke in each compartment having a smoke source therein, wherein the smoke source is one of either a fire or a smoke flow, and wherein analyzing the propagation of smoke comprises evaluating a plume flow of the smoke source therein;

performing a mass and energy balance based on the plume flow to provide an estimated temperature and concentration of the upper smoke layer of the compartment, wherein the pressure of the lower cool air zone of the compartment is known; and determining the predicted smoke propagation path from the mass and energy balance based on the presence of any smoke flows into downstream compartments by solving for conditions in each compartment individually; and storing the estimated temperature and concentration of the upper smoke layer of each compartment having a smoke source therein;

comparing the predicted smoke propagation path to a preferred smoke propagation path to determine if the predicted smoke propagation path is acceptable, wherein the preferred smoke propagation path is designed to control the propagation of smoke according to control criteria, wherein if the predicted smoke propagation path is not acceptable:

providing proposed adjustments to structure mechanisms to modify propagation of smoke;

modeling the propagation of smoke in the structure based on the proposed adjustments to produce a revised predicted smoke propagation path; and comparing the revised predicted smoke propagation path to the preferred smoke propagation path.

\* \* \* \* \*